United States Patent
Lee et al.

(10) Patent No.: US 10,890,456 B2
(45) Date of Patent: Jan. 12, 2021

(54) VEHICLE AND METHOD OF PROVIDING ROUTE GUIDANCE USING PUBLIC TRANSPORTATION

(71) Applicants: HYUNDAI MOTOR COMPANY, Seoul (KR); KIA MOTORS CORPORATION, Seoul (KR)

(72) Inventors: Ah Rang Lee, Seoul (KR); Kyo Woong Choo, Seoul (KR); Yeon Ji Kim, Seoul (KR); Jeong Hun Kim, Seongnam-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 168 days.

(21) Appl. No.: 16/212,293

(22) Filed: Dec. 6, 2018

(65) Prior Publication Data
US 2020/0049518 A1 Feb. 13, 2020

(30) Foreign Application Priority Data
Aug. 7, 2018 (KR) .................. 10-2018-0091759

(51) Int. Cl.
*G01C 21/34* (2006.01)
*G06Q 50/30* (2012.01)
*G08G 1/123* (2006.01)
*G01C 21/36* (2006.01)

(52) U.S. Cl.
CPC ..... *G01C 21/3423* (2013.01); *G01C 21/3492* (2013.01); *G01C 21/3685* (2013.01); *G06Q 50/30* (2013.01); *G08G 1/123* (2013.01); *G06Q 2240/00* (2013.01)

(58) Field of Classification Search
CPC ............ G01C 21/3423; G01C 21/3685; G01C 21/3492; G06Q 50/30; G06Q 2240/00; G08G 1/123; G08G 1/096827; G08G 1/096844; G08G 1/133; G08G 1/143; G08G 1/146; G08G 1/147; G08G 1/14
See application file for complete search history.

(56) References Cited

U.S. PATENT DOCUMENTS

| | | | |
|---|---|---|---|
| 2005/0021227 A1* | 1/2005 | Matsumoto | G01C 21/3415 701/431 |
| 2012/0010809 A1* | 1/2012 | Stut | G01C 21/3423 701/465 |

* cited by examiner

*Primary Examiner* — Brian P Sweeney
(74) *Attorney, Agent, or Firm* — Morgan, Lewis & Bockius LLP

(57) ABSTRACT

A method of providing route guidance includes: acquiring, by a sensor, traveling environment information including at least a target time of arrival at a destination in a vehicle; determining, by a controller, whether the target time of arrival is satisfiable by the vehicle; determining, by the controller, whether the target time of arrival is satisfiable by a public transport connection upon determining that the target time of arrival is not satisfiable by the vehicle, and selecting, by the controller, a parking lot according to a criterion upon determining that the target time of arrival is satisfiable by the public transport connection.

19 Claims, 3 Drawing Sheets

VEHICLE AND METHOD OF PROVIDING ROUTE GUIDANCE USING PUBLIC TRANSPORTATION

CROSS-REFERENCE TO RELATED APPLICATION

This application claims the benefit of priority to Korean Patent Application No. 10-2018-0091759, filed in the Korean Patent Office on Aug. 7, 2018, which is hereby incorporated by reference as if fully set forth herein.

TECHNICAL FIELD

The present disclosure relates to a route guidance method capable of enabling a public transport connection and searching for an optimal parking lot when guiding a route to a destination.

BACKGROUND

Most vehicles which have recently been released are equipped with navigation systems and telematics services. According to the configurations of a vehicle, an optimal route to a destination may be provided to a driver in various forms based on real-time traffic information and a driver schedule.

Upon reflecting the real-time traffic information in route guidance, a method of predicting a traffic congestion situation based on big data may be applied or a route may be modified by reflecting latest traffic information at regular periods. However, since this method assumes that a user arrives at a destination using a vehicle only, it is difficult to cope with unpredictable traffic change or congestion caused by accidents.

For example, if a driver needs to arrive at a destination by noon, it is estimated to take one hour to arrive at the destination as a result of searching for a route based on real-time traffic information at 10:00 am and the driver departs at 10:30 am with a margin time of 30 minutes. In this case, the driver estimates to arrive at the destination at 11:30, but sudden congestion may occur in a downtown area. Thus, even if the detour route is searched for, it may take two hours to arrive at the destination and thus the driver may arrive late. If a subway station or a bus stop where a bus using a bus-only lane stops is present around the driver when sudden congestion occurs, the driver may arrive at the destination using public transportation. In addition, if the driver cannot leave the vehicle to another passenger, it is difficult to use public transportation. Further, even if the driver can leave the vehicle to another passenger, it is inconvenient to newly search for a public transportation route to the destination.

SUMMARY

The present disclosure is directed to a vehicle and method of providing route guidance using public transportation capable of obviating one or more problems due to limitations and disadvantages of the related art.

An object of the present disclosure is to provide a method of guiding a public transport connection according to driving situation change, and a vehicle therefor.

Another object of the present disclosure is to provide a method of guiding an optimal parking lot for a public transport connection and a public transportation route from the parking lot to a destination, and a vehicle therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of providing route guidance includes: acquiring, by a sensor, traveling environment information including at least a target time of arrival at a destination in a vehicle; determining, by a controller, whether the target time of arrival is satisfiable by the vehicle; determining, by the controller, whether the target time of arrival is satisfiable by a public transport connection upon determining that the target time of arrival is not satisfiable by the vehicle; and selecting, by the controller, a parking lot according to a predetermined criterion upon determining that the target time of arrival is satisfiable by the public transport connection.

According to another aspect of the present disclosure, a vehicle for providing route guidance includes: a navigation system configured to determine whether a target time of arrival at a destination is satisfiable by the vehicle; and a controller configured to determine whether the target time of arrival is satisfiable by a public transport connection upon determining that the target time of arrival is not satisfiable by the vehicle, and to select a parking lot according to a criterion upon determining that the target time of arrival is satisfiable by the public transport connection.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
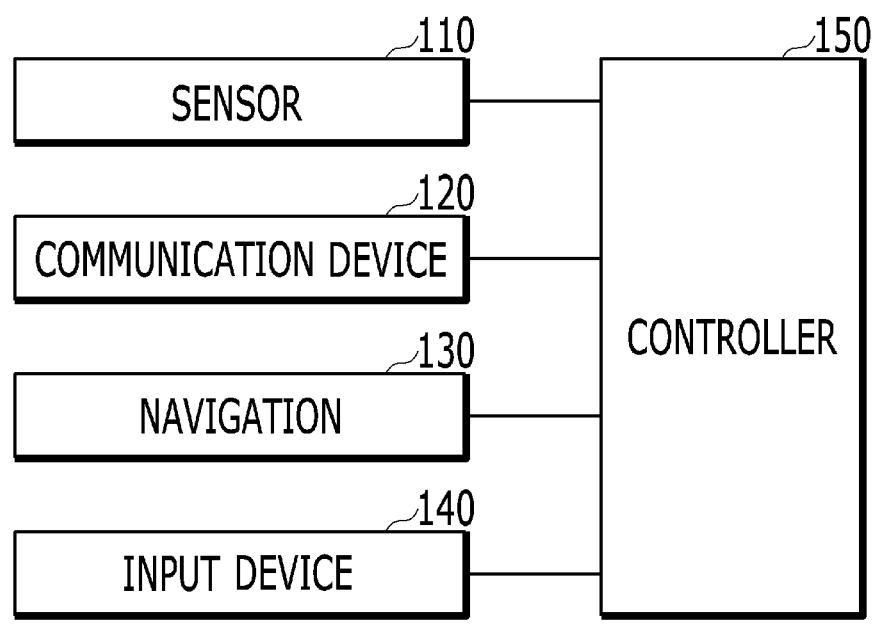
FIG. 1 is a block diagram showing an example of the configuration of a vehicle applicable to an exemplary embodiment of the present disclosure.

Hereinafter, exemplary embodiments of the present invention will be described in detail with reference to the accompanying drawings. Like reference numerals in the drawings denote like elements, and thus their description will be omitted. The terms "unit", "-or/er" and "module" described in the specification indicate a unit for processing at least one function or operation, which may be implemented by hardware, software or a combination thereof. In describing the present disclosure, a detailed description of known functions and configurations will be omitted when it may obscure the subject matter of the present disclosure. The accompanying drawings are used to help easily understood the technical idea of the present disclosure and it should be understood that the idea of present disclosure is not limited by the accompanying drawings. The idea of the present disclosure should be construed to extend to any alterations, equivalents and substitutions besides the accompanying drawings.

It will be understood that, although the terms first, second, etc. may be used herein to describe various elements, these elements should not be limited by these terms. These terms are only used to distinguish one element from another.

It will be understood that when an dement is referred to as being "connected to" another element, the element can be directly connected to the other element or intervening elements may also be present. In contrast, when an element is referred to as being "directly connected to" another element, there are no intervening elements present.

A singular representation may include a plural representation unless context clearly indicates otherwise.

In this specification, the term "have" or "include" signifies the presence of a specific feature, number, step, operation, component, part, or combinations thereof, not excluding the presence or addition of one or more other features, numbers, steps, operations, components, parts, or combinations thereof.

In one embodiment of the present disclosure, when there is a target time of arrival at a destination, if the target time of arrival is not satisfiable due to change in traveling environment while a vehicle travels to the destination, a public transport connection and an optimal parking lot therefor are provided.

According to an aspect of the present embodiment, a traveling environment may include a target time of arrival at a destination, a traffic situation on a traveling route, the external weather of the vehicle, etc.

First, the configuration of the system applicable to the embodiments will be described. FIG. 1 is a block diagram showing an example of the configuration of a vehicle applicable to embodiments of the present disclosure.

Referring to FIG. 1, the vehicle according to the embodiment may include a sensor 110, a communication device 120, a navigation system 130, an input device 140 and a controller 150. Hereinafter, the components will be described in detail.

The sensor 110 may acquire information on the traveling environment such as a traffic situation or an external weather in the vehicle. The sensor 110 may include a rain sensor, an illuminance sensor, an advanced driver assistance system (ADAS), etc., without being limited thereto. For example, the sensor 110 may determine whether it currently rains using the rain sensor or depending on whether or not wipers operate, whether it is currently cloudy through the illuminance sensor or whether congestion has occurred through the ADAS.

The communication device 120 may wirelessly communicate with an external entity (e.g., a server, a smart terminal, a telematics center, etc.) and acquire information on the traveling environment. The communication device 120 may include telematics modem, a cellular communication modem, a short-range communication (Bluetooth, Wi-Fi, NFC, ZigBee, etc.) modem, etc without being limited thereto. For example, the communication device 120 may acquire real-time traffic information or route information based on real-time traffic information through at least some of the above-described modems or acquire information such as weather forecast, surrounding public transportation information, a route to the destination upon using public transportation, information on surrounding parking lots, a target time of arrival at the destination (schedule/calendar information set in a smart terminal or a cloud server), etc.

The navigation system 130 may have map information including surrounding public transportation stations, surrounding parking lot positions, etc. and may perform recommended route search to the destination and route guidance based on the recommended route.

The input device 140 may receive destination information, information on a target time of arrival at a destination, information on coupons available in a parking lot, a discount card information, etc. from a user and may include a button, a dial, a touch pad, a touchscreen, etc., without being limited thereto.

The controller 150 may control the above-described components and collect information acquired by the components and determine a public transport connection and an optimal parking lot therefor if the target time of arrival is not satisfiable due to change in traveling environment while the vehicle travels to the destination.

In one implementation, at least some or all of the components other than the sensor 110 may be implemented by an audio/video/navigation (AVN) system.

For example, the communication device 120, the navigation system 130 and the input device 140 may be installed in the AVN system and the controller 150 may be implemented by a separate controller. Here, the controller 150 may be a processor such as a CPU or electronic control unit (ECU) for controlling various electrical systems in a vehicle. In another implementation, the communication device 120, the navigation system 130, the input device 140 and the controller 140 may be installed in the AVN system or may be implemented through a microcomputer of the AVN system. It is apparent to those skilled in the art that such implementations are exemplary and may be variously changed.

Based on the configuration of the vehicle, the route provision process according to the embodiment will be described with reference to FIG. 2.

Figure 2:
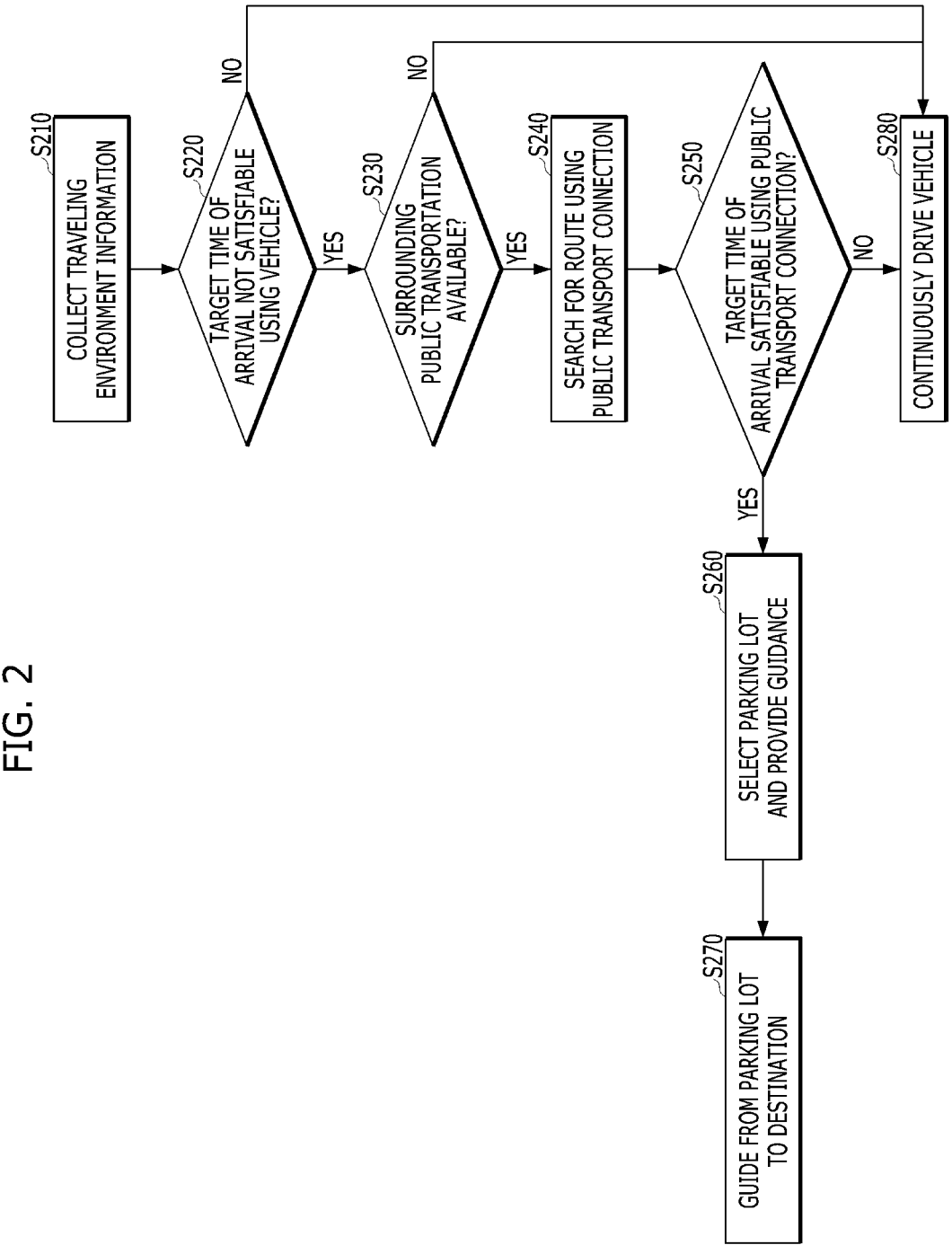
FIG. 2 is a flowchart illustrating an example of a route provision process according to an embodiment of the present disclosure.

FIG. 2 is a flowchart illustrating an example of a route provision process according to an embodiment of the present disclosure.

Referring to FIG. 2, traveling environment information may be collected through the sensor 110, the communication device 120, the input device 140, etc. (S210). As described above, according to an aspect of the present disclosure, the traveling environment may include the target time of arrival at the destination, the traffic situation on a traveling route, the external weather of the vehicle, etc. In this step, at least the destination and information on the target time of arrival at the destination may be acquired.

The navigation system 130 determines an estimated time of arrival at the destination according to traffic information change in real time or at regular periods through update of real-time traffic information, and the controller 150 may determine whether the target time of arrival is satisfiable using the vehicle (S220).

Even if the controller 150 searches for a detour route, upon determining that the target time of arrival is not satisfiable through the vehicle ("NO" S220), the controller 150 may determine whether surrounding public transportation is available through the communication device 120 (S230). Public transportation being available may mean that a point where public transportation capable of allowing the driver to be punctual may be used, such as a bus stop, a subway station, etc., is located within a predetermined distance from the current position or is reachable on the current traveling route within a predetermined time.

If surrounding public transportation is available (Yes of S230), the controller 150 may control the communication device 120 or the navigation system 130 to search for a public transportation route from each of surrounding public transportation availability points to the destination (S240). At this time, the public transportation route is searched for in consideration of a time required to reach the destination by transportation (bus number, subway line, etc.).

Upon determining that the target time of arrival is satisfiable at the time of the public transport connection (Yes of S250), the controller 150 may select a surrounding available parking lot and set route guidance from the current position to the parking lot through the navigation system 130 (S270). At this time, in determining whether the target time of arrival is satisfiable at the time of the public transport connection, the controller 150 may compare a time obtained by adding a predetermined margin time to an estimated time required from each public transportation availability point to the destination with the remaining time to the target time of arrival. The predetermined margin time may be determined as a value fixed in consideration of a time required to travel to the parking lot and a time required to go on foot from the parking lot to each public transportation availability point. A detailed method of selecting a parking lot will be described below with reference to FIG. 3.

Thereafter, after arriving at the selected parking lot, the driver exits the vehicle. Therefore, since route guidance from the parking lot to the destination through the navigation system 130 is impossible, the controller 150 may transmit route information from the parking lot to the destination to the smart terminal of the driver through the communication device 120 (S270). At this time, the route information may be directly transmitted from the vehicle to the terminal of the driver or may be transmitted from the telematics center to the terminal of the driver by transmitting a route provision request from the vehicle to the telematics center.

If the target time of arrival is satisfiable using the vehicle ("NO" S220), if the target time of arrival is not satisfiable but the surrounding public transportation is not available ("NO" S230), if the target time of arrival is not satisfiable even when public transportation is used ("NO" S250), the traveling route guidance of the vehicle may be continuously performed (S280).

Next, step S260 of selecting the parking lot will be described with reference to FIG. 3.

Figure 3:
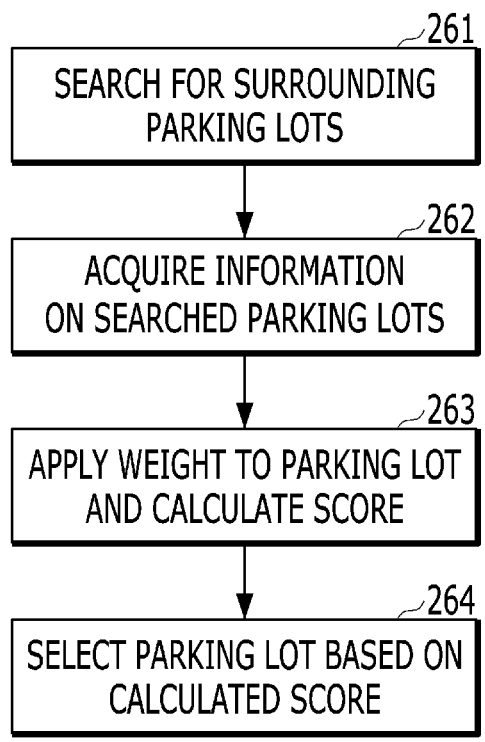
FIG. 3 is a flowchart illustrating a step of selecting a parking lot of FIG. 2 in detail.

FIG. 3 is a flowchart illustrating the step of selecting the parking lot of FIG. 2 in detail.

Referring to FIG. 3, first, surrounding parking lots may be searched for (S261). The surrounding parking lots may mean parking lots which are located a predetermined distance from the current position of the vehicle or which are reachable within a predetermined time.

When the surrounding parking lots are searched for, detailed information of each of the searched parking lots may be acquired (S262).

In detailed search of each process, the map information of the navigation system 130 may be used and surrounding parking lot information may be requested and received from the telematics server.

The controller 150 may apply a weight to each parking lot based on the acquired information and calculate a score (S263).

An example of the types of details and weights is shown in Table 1 below.

TABLE 1

| | item | content |
|---|---|---|
| 1 | Weather cloudiness | # score based on rainfall/precipitation - 0 mm: 10 points/1-3 mm: 9 points/4-10 mm: 8 points/11-20 mm: 7 points/21-30 mm: 6 points/31-50 mm: 5 points/51-100 mm: 4 points/more than 100 mm: 3 points |
| 2 | Parking lot operating hours | # score based on closing time - 24 hour operation: 10 points/PM 12:00: 9 points/PM 11:00: 8 points/PM 10:00: 7 points/PM 09:00: 6 points/PM 08:00: 5 points/PM 07:00: 4 points/before PM 06:00: 3 points |
| 3 | Underground/ground parking lot | # presence/absence of underground parking lot (in case of rain) underground parking lot available: 10 points/no underground parking lot: 5 points |
| 4 | Public transportation availability point | # distance from parking lot to public - transportation availability point 500 m or less: 10 points/500-1 km: 8 points/1-1.5 km: 6 points/1.5 km or more: 4 points |
| 5 | Parking lot discount | # presence/absence of discount card - (or coupon) discount card available: 10 points/no discount card: 5 points |
| 6 | Distance to next destination | # distance from parking lot to next - destination 10 km or less: 10 points/10-20 km: 7 points/20 km or more: 4 points |
| 7 | Remaining parking space (comfort) | # ratio of remaining parking spaces - 80% or more: 10 points/50-80%: 8 points/30-50%: 6 points/30% or less: 4 points |

Referring to Table 1, information on the parking lot may include parking lot operating hours, presence/absence of an underground parking lot, a distance to the public transportation availability point, discount, a distance to a destination, and remaining parking spaces (comfort), without being limited thereto. It is apparent to those skilled in the art that the weights (scores) applied according to situations are exemplary and may be set differently from Table 1.

In case of rain, the weight of the underground parking lot and the weight of the weather may be added up. That is, as an estimated rainfall or a current rainfall increases, the weight of the underground parking lot may increase.

Returning to FIG. 3, when the score of each parking lot is calculated, the controller 150 may select a parking lot based on the calculated score (S264). For example, the controller 150 may select a parking lot having the highest score.

A conventional route guidance method focuses on arriving at a destination in a short period of time using a vehicle. However, route guidance enabling a public transport connection according to the present disclosure can increase user satisfaction by using an alternative method according to the schedule of the driver. In addition, a method of minimizing inconvenience, such as guidance to an underground parking lot considering the weather, may be provided, thereby making everyday life more convenient. In addition, it is possible to seamlessly guide the route through the smart device of the driver to the destination after parking.

According to the embodiments of the present disclosure, it is possible to guide a public transport connection according to driving situation change, in order to satisfy a target time of arrival.

In particular, it is possible to guide an optimal parking lot for a public transport connection and a public transportation route from the parking lot to a destination.

The disclosure can also be embodied as computer readable code on a computer readable recording medium. The computer readable recording medium is any data storage device that can store data which can be thereafter read by a computer system. Examples of the computer readable recording medium include hard disk drives (HDDs), solid state drives (SSDs), silicon disk drives (SDDs), read-only memories (ROMs), random-access memories (RAMs), CD-ROMs, magnetic tapes, floppy disks, and optical data storage devices. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of providing route guidance, the method comprising steps of: acquiring, by a sensor an audio video navigation (AVN) system, traveling environment information including at least a target time of arrival at a destination in a vehicle; determining, by a controller, whether the target time of arrival is satisfiable by the vehicle; determining, by the controller, whether the target time of arrival is satisfiable by a public transport connection upon determining that the target time of arrival is not satisfiable by the vehicle; and selecting, by the controller, a parking lot according to a criterion upon determining that the target time of arrival is satisfiable by the public transport connection, wherein the step of determining whether the target time of arrival is satisfiable by the vehicle is performed at predetermined periods.

2. The method according to claim 1, wherein the step of determining whether the target time of arrival is satisfiable by the public transport connection comprises steps of:
   determining whether a surrounding public transportation is available; and
   searching for a route from at least one public transportation availability point to the destination upon determining that the surrounding public transportation is available.

3. The method according to claim 2, further comprising a step of:
   providing, by the controller, route information including the surrounding public transportation from the parking lot to the destination to an external device of a passenger when arriving at the parking lot.

4. The method according to claim 1, further comprising a step of:
   providing, by the AVN system, route guidance to the parking lot.

5. The method according to claim 1, wherein the step of selecting comprises steps of:
   searching for at least one surrounding parking lot;
   acquiring information on the searched parking lot;
   calculating a score of the searched parking lot based on the acquired information on the searched parking lot; and
   selecting the parking lot based on the calculated score.

6. The method according to claim 5, wherein the information on the parking lot includes at least one of parking lot operating hours, presence or absence of an underground parking lot, a distance to a public transportation availability point, discount, a distance to the destination, or remaining parking spaces.

7. The method according to claim 6, wherein the step of calculating comprises a step of:
   applying a set weight to each of items included in the information on the parking lot.

8. The method according to claim 7, wherein the step of applying comprises a step of:
   applying different weights depending on rainfall and presence or absence of the underground parking lot in case of rain.

9. The method according to claim 1, wherein the step of determining whether the target time of arrival is satisfiable by the vehicle is performed according to traffic information change.

10. A non-transitory computer-readable recording medium having recorded thereon a program for executing a method of providing route guidance according to claim 1, wherein the method comprises steps of: acquiring, by an audio video navigation (AVN) system, traveling environment information including at least a target time of arrival at a destination in a vehicle; determining, by a controller, whether the target time of arrival is satisfiable by the vehicle; determining, by the controller, whether the target time of arrival is satisfiable by a public transport connection upon determining that the target time of arrival is not satisfiable by the vehicle; and selecting, by the controller, a parking lot according to a criterion upon determining that the target time of arrival is satisfiable by the public transport connection, wherein the step of determining whether the target time of arrival is satisfiable by the vehicle is performed at predetermined periods.

11. A vehicle for providing route guidance, the vehicle comprising: a navigation an audio video navigation (AVN) system configured to determine whether a target time of arrival at a destination is satisfiable by the vehicle; and a controller configured to determine whether the target time of arrival is satisfiable by public transport connection upon determining that the target time of arrival is not satisfiable by the vehicle, and to select a parking lot according to a criterion upon determining that the target time of arrival is satisfiable by the public transport connection, wherein the AVN system is configured to determine whether the target time of arrival is satisfiable by the vehicle at predetermined periods.

12. The vehicle according to claim 11, further comprising:
   a communication device configured to wirelessly communicate with an external server,
   wherein the controller configured to determine whether a surrounding public transportation is available using the AVN system or the communication device, and to search for a route from at least one public transportation availability point to the destination upon determining that the surrounding public transportation is available.

13. The vehicle according to claim 12, wherein the AVN system is configured to provide route guidance to the parking lot.

14. The vehicle according to claim 12, wherein the controller is configured to provide route information including the surrounding public transportation from the parking lot to the destination to an external device of a passenger upon arriving at the parking lot.

15. The vehicle according to claim 11, wherein the controller is configured to search for at least one surrounding parking lot, acquires information on the searched parking lot, calculate a score of the searched parking lot based on the acquired information on the searched parking lot, and select the parking lot based on the calculated score.

16. The vehicle according to claim 15, wherein the information on the parking lot includes at least one of parking lot operating hours, presence or absence of an underground parking lot, a distance to a public transportation availability point, discount, a distance to the destination, or remaining parking spaces.

17. The vehicle according to claim 16, wherein the controller is configured to apply a set weight to each of items included in the information on the parking lot.

18. The vehicle according to claim 17, wherein the controller is configured to apply different weights depending on rainfall and presence or absence of the underground parking lot in case of rain.

19. The vehicle according to claim 11, wherein the AVN system is configured to determine whether the target time of arrival is satisfiable by the vehicle according to traffic information change.

\* \* \* \* \*